(12) United States Patent
Yoon et al.

(10) Patent No.: US 7,174,378 B2
(45) Date of Patent: Feb. 6, 2007

(54) CO-LOCATION SERVICE SYSTEM EQUIPPED WITH GLOBAL LOAD BALANCING (GLB) FUNCTION AMONG DISPERSED IDCS

(75) Inventors: Ki J Yoon, Seoul (KR); Dong H Lee, Kyungki-do (KR)

(73) Assignee: NitGen Technologies, Inc. (KR)

( * ) Notice: Subject to any disclaimer, the term of this patent is extended or adjusted under 35 U.S.C. 154(b) by 584 days.

(21) Appl. No.: 09/867,306

(22) Filed: May 29, 2001

(65) Prior Publication Data

US 2001/0047414 A1    Nov. 29, 2001

(30) Foreign Application Priority Data

May 29, 2000  (KR) ............................... 2000-28979
Feb. 1, 2001  (KR) ............................... 2001-04959

(51) Int. Cl.
 *G06F 15/173*  (2006.01)
 *G06F 7/04*  (2006.01)
(52) U.S. Cl. ........................... 709/225; 709/226; 726/2
(58) Field of Classification Search .............. 705/225; 709/217, 223, 226, 227, 225
See application file for complete search history.

(56) References Cited

U.S. PATENT DOCUMENTS

| | | | |
|---|---|---|---|
| 5,930,258 A * | 7/1999 | Dato Solis et al. ......... | 370/401 |
| 6,516,417 B1 * | 2/2003 | Pegrum et al. ............. | 713/201 |
| 6,609,153 B1 * | 8/2003 | Salkewicz .................. | 709/223 |
| 6,687,846 B1 * | 2/2004 | Adrangi et al. ............ | 714/4 |
| 6,697,864 B1 * | 2/2004 | Demirtjis et al. .......... | 709/229 |
| 6,751,729 B1 * | 6/2004 | Giniger et al. ............. | 713/153 |
| 6,765,591 B2 * | 7/2004 | Poisson et al. ............. | 715/735 |
| 6,788,681 B1 * | 9/2004 | Hurren et al. .............. | 370/389 |
| 6,788,692 B1 * | 9/2004 | Boudreau .................... | 370/400 |
| 6,789,118 B1 * | 9/2004 | Rao .......................... | 709/225 |
| 6,937,574 B1 * | 8/2005 | Delaney et al. ............. | 370/254 |
| 6,948,003 B1 * | 9/2005 | Newman et al. ............ | 709/250 |
| 2002/0049840 A1 * | 4/2002 | Squire et al. ............... | 709/225 |

OTHER PUBLICATIONS

Load balancing a cluster of web servers: using distributed packet re-writing, Aversa, L., et. al. Performance, Comp., and Comm. Conf., Feb. 2000, ISBN 0-7803-5979-8, pp. 24-29.*
Survey of unified switching techniques for integrating service networks, Bradley, T., et. al., Telecom. Symp., Sep. 1990, INSPEC Acc. No. 4143198, pp. 0338-0344.*
Network Working Group, RFC 1631, The IP Network Address Translator (NAT), Egevang, K., et. al., May 1994.*
Design of Giga-Bit/s Optical Interconnection Network for Computer Cluster, Zhou, Ge, et. al., Jun. 1998, IEEE ISBN 0-8186-8572-Jul. 1998, pp. 194-199.*

* cited by examiner

*Primary Examiner*—Beatriz Prieto
(74) *Attorney, Agent, or Firm*—Harness, Dickey & Pierce, P.L.C.

(57) ABSTRACT

A system for providing a co-location service comprises a plurality of switching hubs for changing public IP address into private IP address, a plurality of giga lines for connecting the switching hubs, a L4 switch for performing the server load balancing, a customer server connected to the L4 switch by means of the private IP networks and a GLB server for finding a shortest path for a client computer.

2 Claims, 10 Drawing Sheets

CO-LOCATION SERVICE SYSTEM EQUIPPED WITH GLOBAL LOAD BALANCING (GLB) FUNCTION AMONG DISPERSED IDCS

BACKGROUND OF THE INVENTION

1. Field of the Invention

The present invention relates to a service method for a construction of networks having automatic backup and load-balancing upon failures to networks and systems, and more particularly to a dedicated private network service method having a load-balancing function wherein connections become available by IDC center in a pubic IP networks by GLB servers upon user's connections, the network backup is available since a bypass path is made to normally operating IDC centers upon failures to a specific IDC, and load-balancing as to entire servers is available by constructing network equipment changeable into a private IP network in case of connecting to the IDC centers, connecting the network equipment by Giga lines, and using dispersed IDCs as a network constructed in one place.

2. Reference to Related Patents Applications

U.S. Pat. No. 6,230,205 Method and apparatus for managing delivery of multimedia content in a communications system U.S. Pat. No. 6,216,141 System and method for integrating a document into a desktop window on a client computer U.S. Pat. No. 6,185,686 Computer system and process for accessing an encrypted and self-decrypting digital information product while restricting access to decrypted digital information U.S. Pat. No. 6,175,925 Tamper resistant player for scrambled contents U.S. Pat. No. 6,173,407 Method of authenticating and charging a client using a web infoshop service system U.S. Pat. No. 6,154,771 Real-time receipt, decompression and play of compressed streaming video/hypervideo; with thumbnail display of past scenes and with replay, hyperlinking and/or recording permissively initiated retrospectively U.S. Pat. No. 6,128,655 Distribution mechanism for filtering, formatting and reuse of web based content U.S. Pat. No. 6,115,712 Mechanism for combining data analysis algorithms with databases on the internet U.S. Pat. No. 6,108,703 Global hosting system U.S. Pat. No. 6,108,637 Content display monitor U.S. Pat. No. 6,065,058 Dynamic push filtering based on information exchanged among nodes in a proxy hierarchy U.S. Pat. No. 6,064,385 Systems with user preference setting schemes U.S. Pat. No. 6,052,780 Computer system and process for accessing an encrypted and self-decrypting digital information product while restricting access to decrypted digital information U.S. Pat. No. 6,037,928 System and method for providing restrained, streamlined access to a computerized information source U.S. Pat. No. 6,034,652 Attention manager for occupying the peripheral attention of a person in the vicinity of a display device U.S. Pat. No. 5,991,306 Pull based, intelligent caching system and method for delivering data over a network U.S. Pat. No. 5,933,811 System and method for delivering customized advertisements within interactive communication systems U.S. Pat. No. 5,931,904 Method for reducing the delay between the time a data page is requested and the time the data page is displayed U.S. Pat. No. 5,857,190 Event logging system and method for logging events in a network system U.S. Pat. No. 5,819,092 Online service development tool with fee setting capabilities U.S. Pat. No. 6,009,081 Private network access point router for interconnecting among internet route providers U.S. Pat. No. 5,864,823 Integrated virtual telecommunication system for E-commerce 3. Description of Related Art The networks all over the world are connected to the internet at present like a web, centering around the United States of America, in which network service providers(NSP) or internet service providers(ISP) among many countries are constructed in an interconnected form, and to which companies' systems for providing services are connected to be constructed in a form of providing necessary information to all people.

Figure 1:
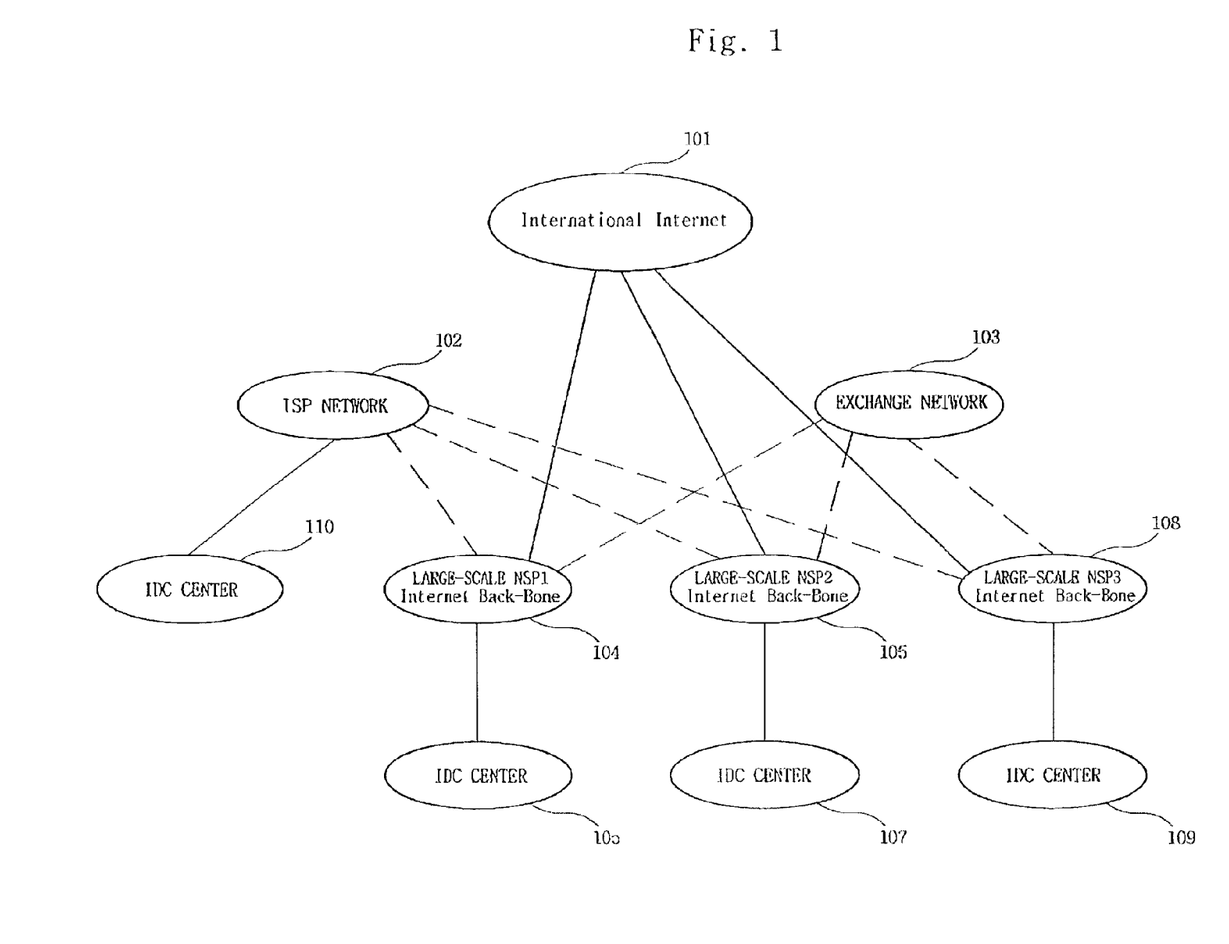
FIG. 1 is a conceptual view of a general internet network.

FIG. 1 is a conceptual view of a general internet network. As shown in FIG. 1, the structure of the network includes an international network 101 interconnected by country, and large-scale NSPs 104, 106, and 108 are connected to the international network 101. Further, there is an exchange network 103 for mutually associating among the NSPs 104, 106, and 108.

Further, respective companies such as NSPs 104, 106, 108 or ISP 102 have internet data centers(IDCs) 105, 107, 109, and 110 of their own operating.

The internet data centers 105, 107, 109, and 110, which are large-scale facilities of servers mainly managed by companies' computer centers, web hosting companies, and so on, are managed to secure the maximum effect at a minimum expense for companies.

Services provided in the internet data centers 105, 107, 109, and 110 are to be formed in lease services with the computer centers operated by the existing companies themselves, including a co-location service for leasing space for servers to be placed, a tele-housing service for leasing space for communication equipment, a server-hosting service for leasing space together with a server, a web hosting service for leasing a server by plural companies, and the like. Companies doing the IDC business at home are KIDC company that has been spun off the Dacom, KTIDC of Korea Telecommunications, N-GENE of Hanaro communications, and so on.

However, among respective NSP companies in the conventional technologies, there exists a problem in that it is difficult to receive a high-speed service since, in order for a subscriber to an NSP company to receive services by connecting to a service system(contents provider) installed in another NSP company, a connection to the service system is available through an overseas NSP company(this description on the art prior to building a home interconnecting network). Further, since services are provided as home internet traffic travels via overseas, a problem occurs that continuously expands expensive international internet lines.

Further, in order to solve the above problems, a home interconnection network is constructed to handle the home traffic at home by interconnecting the networks of respective NSPs providing services, but a problem arises since failures frequently occur due to an overload of the home interconnection network and the speed becomes severely slow. In order to solve the problem, a further establishment of the home interconnection network is required, but it is difficult to establish it further due to conflicts of interest among the companies.

Moreover, upon occurrences of failures of an IDC center built by each NSP or ISP company based on an infrastructure of their own, a problem occurs that service companies such as contents providers receiving/providing services by connecting to the IDC center stop providing services till recoveries from the failures.

In order to solve the above problem, double lines are constructed and spare equipment are additionally mounted against failures when constructing internet lines, so that the spare equipment or lines can be substituted upon the occurrences of failures of the lines or equipment in use to continue services, but a problem arises in that all the above work is manually performed.

Still, in order to solve the above problem, some service companies disperse the systems in plural IDC centers, but, upon a failure of one specific IDC center, traffic is concentrated on the network of other IDC centers which are normally operated, so there exists a problem in that the systems providing services in the other IDC centers are overloaded to stop their operations.

Still more, a technology has been developed to perform internet services by concentrating respective ISP lines to one center, so a method appears for constructing a network of a form capable of continuing services via an ISP upon a failure of another ISP network, but this also has a problem in that continuous services can not be performed with a roundabout way when in a failure of one concentrated center, and another problem in that a continuous build-up of lines is required as traffic to the ISP lines increases. Further, there exists a problem in that, in order to solve security problems due to use of public IP addresses, separate security equipment has to be used, and, in order for interconnections among networks of other companies, a network is constructed by using a complicated routing protocol.

In the meantime, in order to solve a problem that slows services thanks to a traffic concentration in recent, the contents delivery network(CDN) service is employed, but this is to provide services by using a caching function, which connects caching servers for the CDN at every node across the country. Therefore, a problem arises that requires lots of investment money and maintenance cost for operating the CDN.

SUMMARY OF THE INVENTION

The present invention has been devised to solve the above problems, so it is an object of the present invention to provide a dedicated private network service method wherein the service can be implemented in software without a separate hardware equipment and expanded regardless of equipment and the costs of connectors are low.

Further, in order to solve the above problems, it is an object of the present invention to provide a dedicated private network service method wherein private IP networks built in the IDC are connected in Giga lines to operate the private IP networks built in the IDCs in different places as one network.

Further, it is an object of the present invention to build a backup system among respective IDC centers by using a dedicated private networks.

Further, it is an object of the present invention to provide a dedicated private network service method wherein connections are performed by IDC center at the public IP network by a GLB server and bypass connections are performed to an IDC which normally operates upon a specific IDC failure, so a network backup function is applied, and load balancing is available for private networks by connecting IDC centers dispersed by area with Giga lines.

Further, it is an object of the present invention to provide a dedicated private network service method wherein a private network is connected to a normal server by checking states of plural servers upon connection of the private network to a service server or the load balancing is available upon connections among servers by checking overloads or simultaneous users of servers.

Further, it is an object of the present invention to provide a dedicated private network service method wherein perfect networks, load balancing of a system, and a backup path automatically able to pass by upon system failures are available with a software portion constructed to be automatically changed to a spare interface by a program upon a failure of an interface card against failures of interface cards and gateway equipment in operation in a system. In order to achieve the above objects, a method according to the present invention comprises steps of (1) performing packet filtering if connected to a private network after a user drives a connector and connects to an internet data center(IDC) through a dial-up subscriber network; (2) providing a private network IP address to the user by a PPP server if the user is authorized as an authentication server performs a user authentication; and (3) forming a virtual tunnel to connect to a subscriber server system via connection procedures in a subscriber equipment existing in a private network.

Further, the present invention comprises steps of (1) performing packet filtering if connected to a dedicated private network after a user connects to the internet and then inputs a domain name in an URL input window of a web browser; (2) performing a user authentication in a user authentication server; (3) performing a secondary packet filtering by selecting a service port by company if the user is authorized as a result of the user authentication performance at the step (2); and (4) allowing, if the user is an authorized subscriber, the subscriber to use a private network service by providing a different private IP address by company, separating from a public IP address, and connecting to a server by company, after performing the secondary packet filtering at the step (3).

Further, a method according to the present invention comprises steps of (1) performing a bypass connection to an IDC normally operated upon a failure of a specific IDC by connecting a user by IDC center in a public IP network by a GLB server upon a user's connection; (2) changing a public IP address to a private IP address upon a connection to the dedicated private network; (3) load-balancing traffic to plural IDC centers after interactively connecting the respective IDC centers by constructing a ring-shape network with the IDC centers of private IP networks connected by Giga lines; and (4) performing the load balancing of servers by identifying server states at SLB servers in the respective IDC centers.

In general, a virtual private network(VPN) is a network that provides a private network function by using a public network. In particular, the virtual private network in the internet is to provide a private network function through the internet which is a public data network constructed with an IP protocol, which has a security function in order to secure privacy of information transmitted in the internet which is a network of a connectionless type. That is, the virtual private network is a communication service capable of greatly reducing line costs by using the public network such as the internet as a dedicated network.

However, conventional private network service technologies require separate hardware equipment for providing a virtual private network, which causes difficulties in expansions and introductions of new equipment since there is no compatibility with different equipment. Further, there exists a problem in that a virtual private network installation program which is installed in a subscriber computer(PC) is expensive.

Services capable of using dedicated private networks according to the present invention, which further enhance concepts similar to such virtual private networks, include 1) an account service which enables subscribers to use a specific internet service in a form of a dedicated private network in case that the subscribers have no internet connection ID by allocating private PPP IP to the subscribers upon connections, and 2) a bypass service which enables the subscribers to use the service by connecting to service equipment positioned in a private network without separate subscribers' manipulations by positioning subscriber service equipment in the private network.

Further, a free call service provided in one form of the account service is a service that connects a function of an inward wide area telephone service which uses an intellectual service to a data communication service, which is to provide a private network service by providing subscribers with information of a web and a text form free of telephone fees.

The above present invention is not operated by specific equipment, but a software module of its own developing, which is a service inducing mass traffic without limitation to the number of users connected, and a service which enables subscribers to use a private network only with a service use fee without investments for other equipment and constructions of networks.

Further, the existing VPN service requires VPN equipment provided from companies and a virtual private network installation program installed in a subscriber(PC), but the dedicated private network according to the present invention can be constructed into three types:

Firstly, a method of using a dedicated private network service which connects to the internet through the telephone connection networking to a network a telecommunication company holds, secondly, a method of using a dedicated private network service by using a connector provided free of charge, and, thirdly, a method of using a dedicated private network service in a bypass form upon connections through the internet.

Here, in case of a installation program installed in a subscriber computer(PC) in the method of using a dedicated private network service by using a connector provided free of charge, menus for several entry companies in the program can be registered, and forms capable of receiving services by connecting to a private network in diverse methods can be constructed, including a function capable of executing connections by selecting a specific company to be connected out of several companies before connections and a function capable of performing connections through a network connection telephone number and a dedicated internet line a telecommunication company operates in a connector.

In the meantime, the method of using a dedicated private network service through the telephone connection networking to a network the telecommunication company holds is substantially similar in process to a method of using a dedicated private network in a bypass form through the internet except for a network(for example, telephone network) employed, in connection procedures.

Accordingly, in here, descriptions will be made on the account server and the bypass service, respectively.

As a method for providing the dedicated private network service according to the present invention is compared with the existing virtual private network service(VPN), since the existing VPN service is constructed in the WAN among an ISP and service equipment, the existing VPN service has a limit upon connection over a specific speed, and can be used for restrained purposes by limited users, rather than for providing services for the undefined. However, the dedicated private service according to the present invention, with a dedicated private network directly connected to respective company servers, is to connect to server equipment directly connected to a private network regardless of a connection speed(for example, Giga) upon connection to a subscriber system in order for undefined plural terminating subscribers to use respective company services by the private network rather than a public network, not passing through firewalls.

Accordingly, since the service servers of companies in the dedicated private network are directly connected, a private network construction becomes possible without limitations to connection speeds, so mass traffic can be accommodated with lots of subscribers connected without limitations to the number of people.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERED EMBODIMENTS

Hereinafter, preferred embodiments of the present invention will be described in detail with reference to the accompanying drawings.

Figure 2:
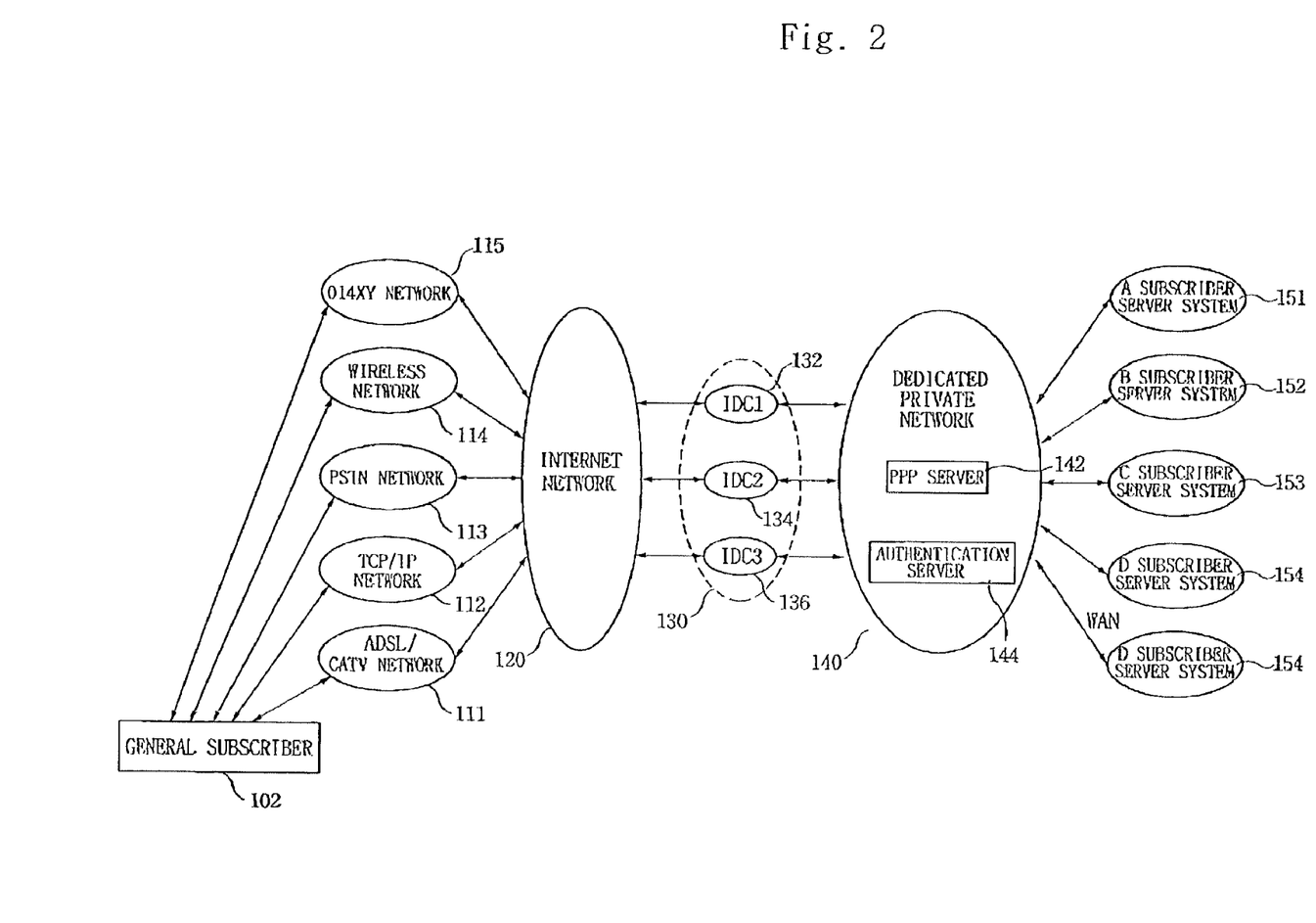
FIG. 2 is a view for showing a network structure for dedicated private network services according to the present invention.

FIG. 2 is a view for showing a network structure for dedicated private network services according to the present invention.

As shown in FIG. 2, a general subscriber 102 connects to an internet network 120 through any of a 014XY network 115, a wireless network 114, a PSTN network 113, a TCP/IP network 112, and an ADSL/CATV network 111, and an internet data center 130 connects the internet network 120 and the dedicated private network 140, and plural subscriber server systems 151 to 154 are connected to the dedicated private network 140.

In order to construct a dedicated private network according to the present invention, the dedicated private network includes an authentication server 144 and a PPP server 142 for providing a private IP, connecting to the subscriber server system 154 in a wide area network(WAN). The 014XY network 115, wireless network 114, public telephone network 113, TCP/IP network 112, and ADSL/CATV network 111 are subscriber connection networks to which subscribers subscribe for internet services, and chosen according to subscribers' environments.

Every telecommunication company/internet service company holds an internet data center of their own which provides computer equipment installation and internet lines, every internet data center constructs private networks into dedicated private networks for companies, and the dedicated private networks are interconnected in order for dedicated private network services to be available via the networks of any telecommunication companies and to process subscribers in balance by server within the dedicated private network, being a service form which backup operations are possible. Further, the subscriber server systems 151 to 154 are directly connected to the dedicated private network, which is a company system(or a network) that provides an application program to general subscribers through the private networks.

Now, an account service according to an embodiment of the present invention will be described in detail as follows.

First, general subscribers connect to the 014XY network by driving connectors the subscribers 151, 152, 153, and 154 distributes.

Accordingly, the 014XY network establishes connections between connected general companies and a telecommunication company such as Dacom and the like.

The remote access server(RAS) positioned at the termination of the telecommunication company requests a user authentication to the remote authentication dial-in user service(RADIUS).

At this time, the connectors that general subscribers drive transfer information on the subscribers who have distributed the connectors to the telecommunication company. Accordingly, the RADIUS of the telecommunication company opens passageways to the corresponding subscribers 151, 152, 153, and 154 by the RAS. That is, the RAS does not allocate dynamic IP address, but opens a passageway to an authentication server 144 positioned in the dedicated private network via the internet data centers 132, 134, and 136 constructed by telecommunication company.

The authentication server 144 identifies accounts, for example, IDs and passwords, of general subscribers, and requests an allocations of private IP addresses for the subscribers 151, 152, 153, and 154 who tend to use corresponding services to the PPP server 142 in case of authorized users.

If the PPP server 142 is requested to allocate the private IP addresses, the PPP server 142 allocates and transfers to the authentication server 144 the private IP addresses of the corresponding subscribers, and the authentication server 144 transfers the private IP addresses to the general subscribers.

By doing so, the general subscribers use the subscriber servers 151, 152, 153, and 154 just like they connect to the private LAN network of the corresponding subscribers 151, 152, 153, and 154.

That is, as stated above, the dedicated private network service according to the present invention can provide the IP addresses for the private network to the general subscribers (PC) 102 by solving the problems of the virtual private network service restrictively used and provided in the existing telecommunication equipment and by correcting a kernel portion of the PPP server 142 for providing the private IPs.

Further, the connectors installed in the general subscriber computers receive private network IPs from the PPP server 142 by internally establishing virtual devices, and the IPs received from the PPP server 142 are private network IPs, so the connected PCs operates as connected to a private network rather than a public network. Accordingly, accesses or invasions from those who are not authenticated can be prevented. Further, diverse security protocols are applied to the dedicated private network according to the present invention, so encryption is applied between the PPP server 142 and the general subscribers(PCs) 102. at this time, as the subscribers desire, the subscribers can connect to additional information services connected to the private network by using the connectors.

The authentication server 144 of the private network cause to provide the private network IP addresses through the PPP server 142 by performing a subscriber authentication function in the area of the dedicated private network service according to the present invention. That is, the authentication server 44 in the private network is equipment for providing authentications in order for the subscribers to execute connections with IDs and passwords provided from the private network. Accordingly, in case that the authentication is completed, a virtual tunnel is made to connect to the subscriber server systems 151, 152, 153, and 154 via connection procedures in the equipment of the subscribers existing in the private network.

Next, a description will be made in detail on a bypass service according to another embodiment of the present invention.

First, the general subscribers 102 execute a dedicated emulator a telecommunication company distribute to hook up on the telecommunication company. At this time, there are the 014XY network 115 and the PSTN network 113 for available networks.

Once connected to the telecommunication company, the RAS positioned at the termination of the telecommunication company requests a user authentication to the RADIUS, and, if the RADIUS executes the user authentication, an authorized user can use services the telecommunication company provides.

At this time, if the general subscribers 102 want to connect to the internet and request an internet connection, the RAS located at the termination of the telecommunication company allocates dynamic IP addresses to the general subscribers 102, so the general subscribers 102 can use the internet by driving a web browser.

In the meantime, the general subscribers 102 can hook up to the internet through the wireless network 104 by using the WAP or the mobile explorer.

Further, the general subscribers 102 can hook up to the internet through the TCP/IP network 113 or through the ADSL/CATV network 111 by using dedicated lines and so on.

As stated above, in case of connecting to the internet through a dedicated emulator, wireless network 114, TCP/IP network 112, or ADSL/CATV network 111, since dynamic IP addresses or static IP addresses have been already allocated, the dedicated private network can not be constructed in the method of allocating private IP addresses as in the account service.

Accordingly, in the above case, if the general subscribers 102 input domain names in the URL input windows to use the subscriber server systems 151, 152, 153, and 154 connected to the dedicated private network 140 on the way of their using the internet, the DNS server transfers to the general subscribers the IP addresses(in general, virtual IP address(VIP) are used) corresponding to the domain names inputted to connect to the dedicated private network 140.

At this time, a switching hub(not shown) existing in the dedicated private network 140 inputs a destination address the general subscribers transfer, identifies the subscriber server systems 151, 152, 153, 154, and 155 corresponding to it, and transfers data by taking the IP address corresponding to respective subscriber server systems 151, 152, 153, 154, and 155 as the destination address. At this time, a source address is converted into a VIP address.

By doing so, the subscriber server systems 151, 152, 153, and 154, in case of processing data and then transferring the processed result, transfers data to the switching hub by taking the private IP addresses of their own as the source addresses and the VIP addresses as the destination addresses.

At this time, the switching hub transfers by converting the destination addresses into the general subscriber IP addresses it stores and converting the source addresses into the VIP addresses.

Accordingly, the front stage(internet network) of the dedicated private network 140 exists in a public network of using a public IP address, and the rear stage(dedicated private network) of the dedicated private network 140 functions as a private network of using a private IP address.

Further, at this time, by connecting the switching hub(not shown) respectively connected between the IDCs 132, 134, and 136 and the dedicated private network 140 by means of a giga network, the load balance are available while used at a high speed, by servers of the subscriber server systems 151, 152, 153, and 154 at the rear stage(dedicated private network) separately installed by plural IDC centers, even though the general subscribers are connected through a communication network of any network company.

That is, subscribers can be connected regardless of what connection port it is.

By doing so, in the existing virtual private network(VPN), the number of people to be accommodated at the maximum upon executing services through equipment provided from product of its own, but, at the time of using the dedicated private network according to the present invention, the use is possible without a limitation to the number of people. Further, backups are available by respective IDCs by constructing networks for private networks by respective IDCs, and subscribers can connect regardless of what connection port of any network communication company it may be.

In particular, in the points different from the VPN serviced by the existing equipment, services using the existing equipment emphasizes service supports by the UDP between client software installed in PC and VPN equipment, but, in case of the dedicated private network service according to the present invention, stable services are available since the services are provided by the TCP. Further, since the service enables a construction of a private network by an adjustment of a kernel portion of the system, any system can be applied, and connections can be made without a limitation of the number of people. That is, when servicing for a specific network equipment company, there is a limitation of the number of users by equipment and cost is high, but, in the dedicated private network service according to the present invention, direct connection to the system is available to use and expansibility is high without a limitation of network equipment to a specific company.

Figure 3:
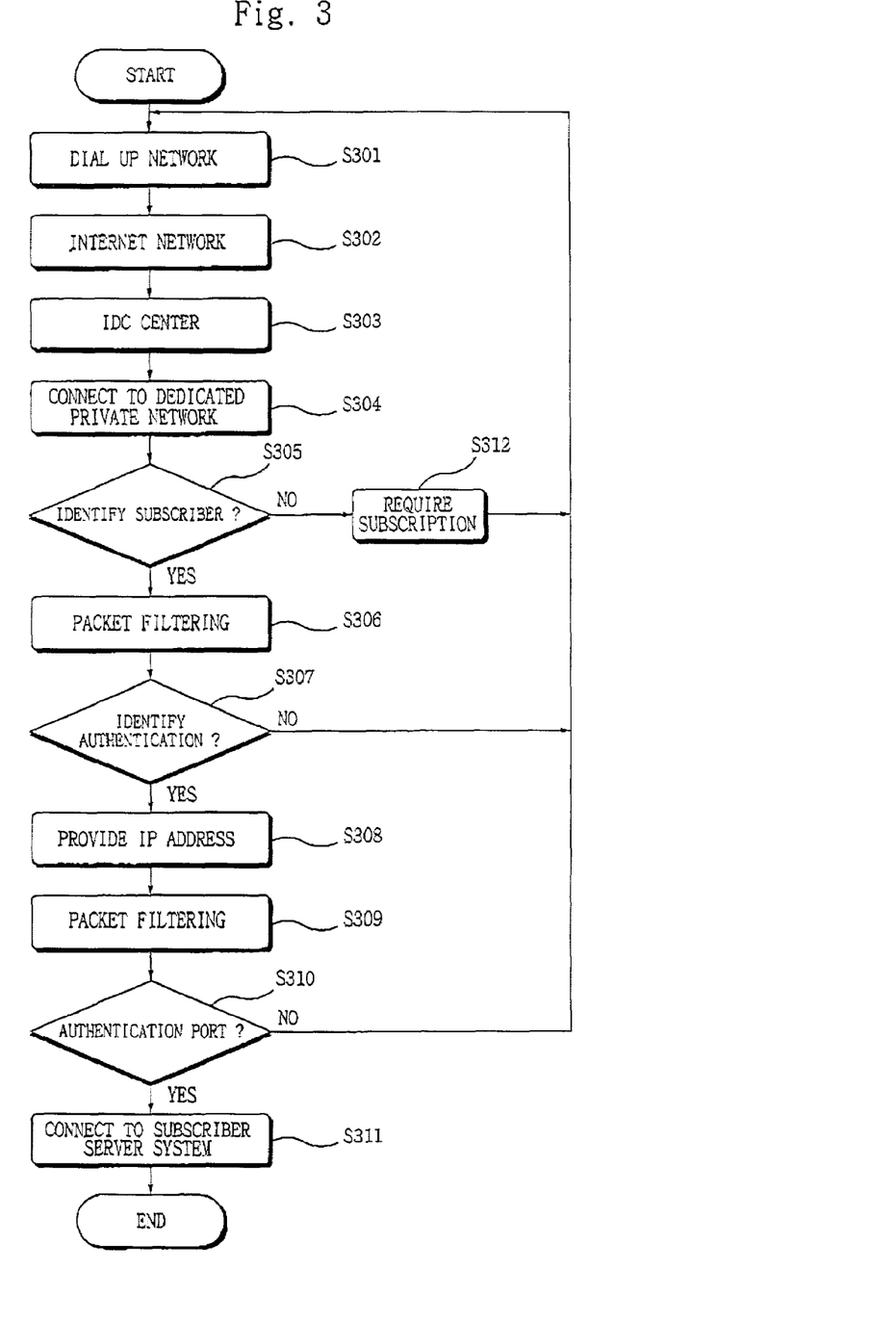
FIG. 3 is a flow chart for an account service according to an embodiment of the present invention.
Figure 4:
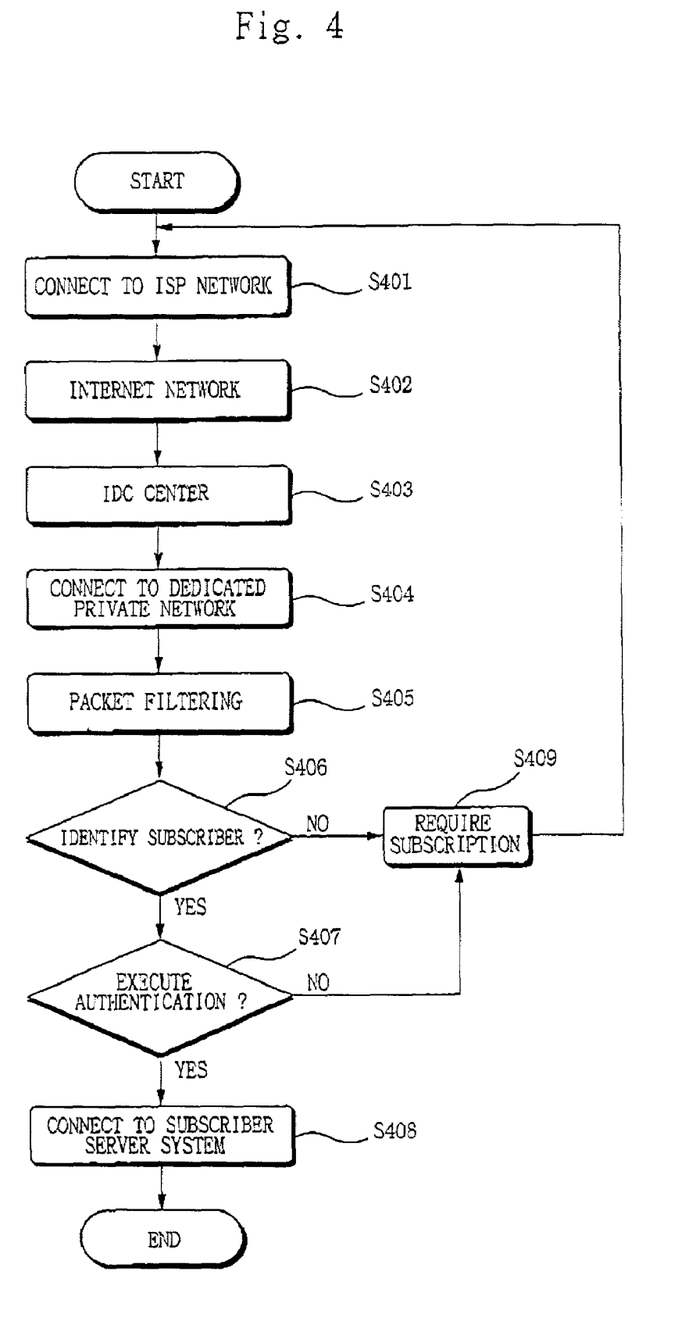
FIG. 4 is a flow chart for a method for providing bypass services according to another embodiment of the present invention.
Figure 5:
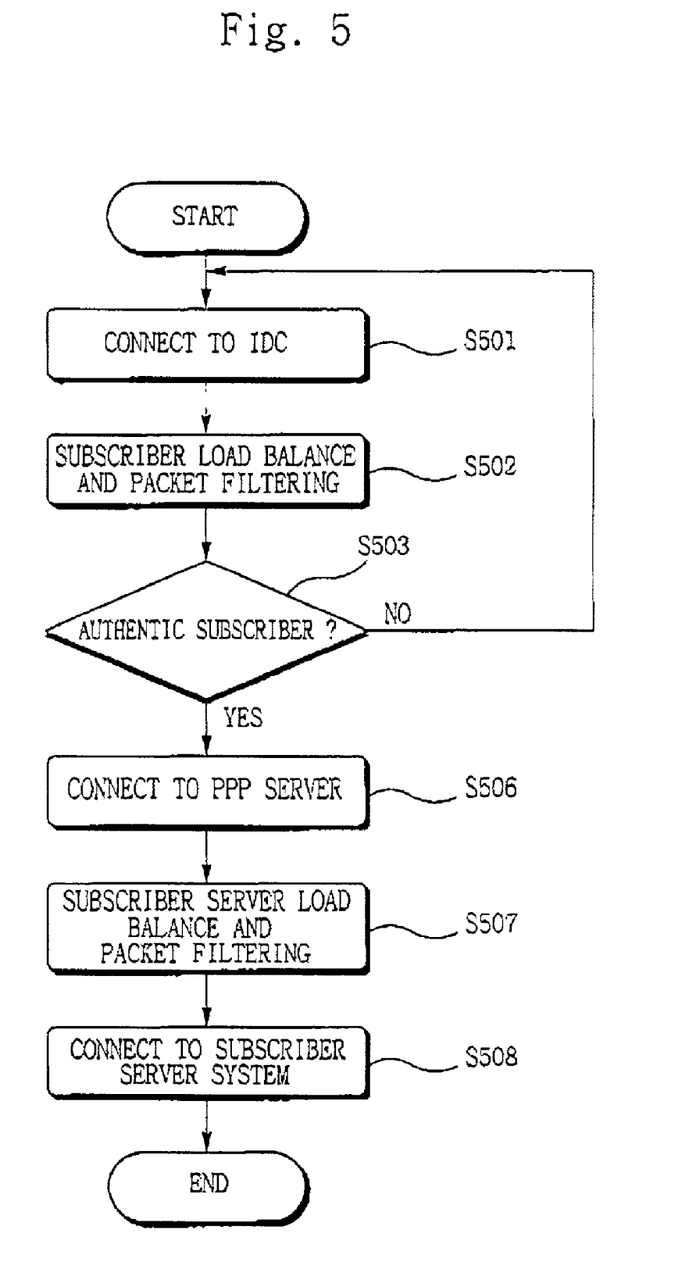
FIG. 5 is a flow chart for showing connection procedures from an internet data center to a subscriber server according to the present invention.

In the construction as stated above, a passageway the general subscribers use respective networks to hook up to a subscriber server system of a private network are the same as shown in FIG. 3 to FIG. 5.

FIG. 3 is a flow chart for an account service according to an embodiment of the present invention.

As shown in FIG. 3, a general subscriber dials up and tries to hook up on the internet through the 014XY network or the PSTN network by using a connector an administrator of a subscriber server system distributes(S301).

At this time, the 014XY or the PSTN network provide a passageway to a communication company, and the communication company establishes a path to an authentication server of a dedicated private network by using administrator information of the subscriber server system transferred from the connector upon connecting to the network.

That is, a connection is made to the dedicated private network(S304), via the internet network(S302) through an IDC center(S303).

Thereafter, the authentication server of the dedicated private network executes a subscriber authentication procedure(S305), requests a registration if the subscriber is not authorized(S312), and performs packet filtering if the subscriber is authorized(S306). Here, the packet filtering may be realized to be executed before performing the subscriber authentication procedure.

Next, after identifying whether subscriber's ID and password are correct via the authentication(S307) in a state of a first connection, the connection is re-started from the beginning if not correct, and a private network IP address is provided to a subscriber PC 102 tried for a connection if correct(S308).

Thereafter, operations are performed in the area of the private network, via second packet filtering(S309, S310), and then via an authentication in a subscribed subscriber server system, a predetermined application program provided from the subscriber server system is executed in order for the connection to become available only to a designated socket port number, to thereby prevent external invasions (S311). If not a subscriber, the authentication server of the dedicated private network requests a registration and starts the connection procedure again(S312). In here, it may be realized to simultaneously execute the first and second packet filtering.

FIG. 4 is a flow chart for a method for providing bypass services according to another embodiment of the present invention.

As shown in FIG. 4, in a method for providing bypass services according to another embodiment of the present invention, first, after a general subscriber connects to a telecommunication company by using a telephone network, if the general subscriber requests a connection to the internet on the way of using a service provided by the telecommunication company, the telecommunication company allocates a dynamic IP address and provides an internet connection.

Further, the general subscriber can connect to the internet by using a dedicated network, ADSL/CATV, or the like, and, at this time, a static or a dynamic IP address is used(S401, S402).

Thereafter, the general subscriber inputs a domain name in the URL input window of a web browser to connect to an IDC center according to an IP address registered to the DNS server(S403) and then to connect to the dedicated private network(S404).

The private network identifies the subscriber, executes a first security authentication, performs packet filtering(IP address, service port numbers by company)(S405), and identifies the subscriber(S406).

As a result of identification, if the general subscriber is authorized, the private network executes a data filtering job, selects a service port by company, performs a second security authentication(S407), provides different private IP addresses by company, and separates them from public IP addresses. Thereafter, a connection is made to a server by company in order for the subscriber to use the private network service(S408). If not authorized, the private network requests a registration and starts the connection procedure again(S409).

Eventually, a connection is made in a service-available state in a structure of the private network from the execution of the packet filtering, and, via an authentication of the subscriber connected to the area of the private network, the connection can be made only to a socket port number designated at an application program provided in a subscriber server system.

FIG. 5 is a flow chart for showing connection procedures from an internet data center to a subscriber server according to the present invention.

As shown in FIG. 5, a subscriber connected to an internet data center(IDC) connects to layer-4 switching hub equipment, if the subscriber is authorized, with the executions of subscriber load balance and packet filtering in communication equipment primarily connected through a private network(S501, S502).

After identifying if the subscriber is authorized, in case of the dial-up, an IP address is provided to the subscriber PC trying a connection via a private PPP server and then load balance and packet filtering of a subscriber server are processed. Further, the subscriber requesting the connection is connected to a subscriber server system to operate in a private network form(S503 to S506).

Figure 6:
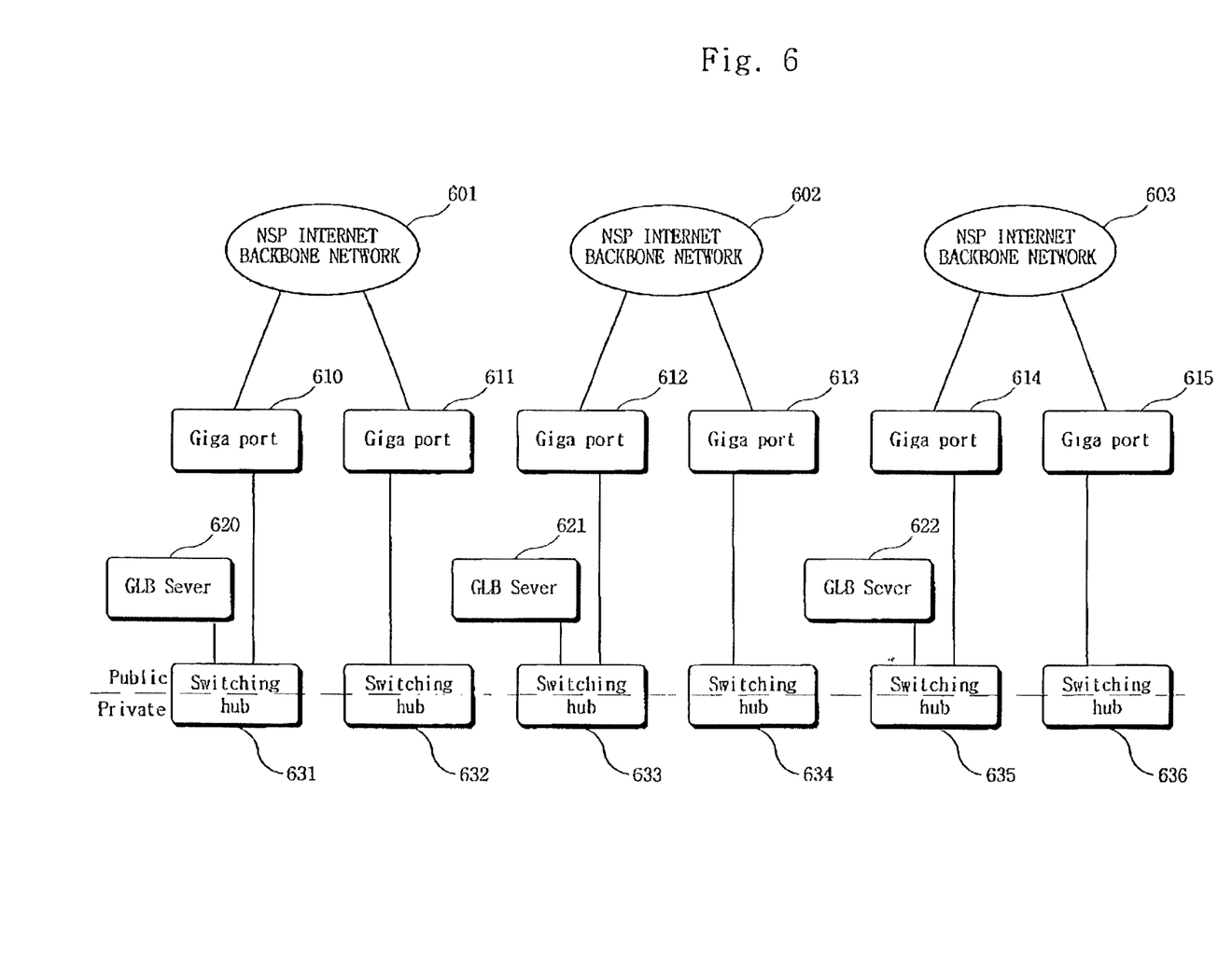
FIG. 6 is a view for showing a structure of a dedicated private network equipped with a global loading balancing (GLB) function according to another embodiment of the present invention.

FIG. 6 is a view for showing a structure of a dedicated private network equipped with a global loading balancing (GLB) function according to another embodiment of the present invention.

As shown in FIG. 6, switching hubs 631, 632, 633, 634, and 635 of a private network are connected to giga ports 610, 611, 612, 613, 614, and 615 in an IDC center. Further, the IDC center uses a built-in router and routers that NSP internet backbone networks 601, 602, and 603 have to construct an internet line of a Giga class.

Further, GLB servers 620, 621, and 622 are connected to a public network stage of the switching hubs 631, 632, 633, 634, and 635 which are connected to the respective IDCs.

Further, the switching hubs 631, 632, 633, 634, and 635 are connected to a giga-class line(not shown) therebetween.

The GLB servers 620, 621, and 622 are dispersed in the servers constructed in the respective IDCs and sequentially perform connections, or check internet traffic and find the shortest path, to enable connections to services.

In case that failures of the networks of the NSP and ISP companies occur, the GLB servers automatically construct to enable connections in a path normally operating.

Next, in order to change to a private IP address, two VLANs(Virtual Local Area Networks) are constructed with the switching hubs 631, 632, 633, 634, and 635, one is placed in a public IP address area and connects internet service lines, and the other is placed in a private IP address area and designates and applies private IP addresses as to respective servers, and the two VLANs are constructed to be interconnected to each other.

Figure 7:
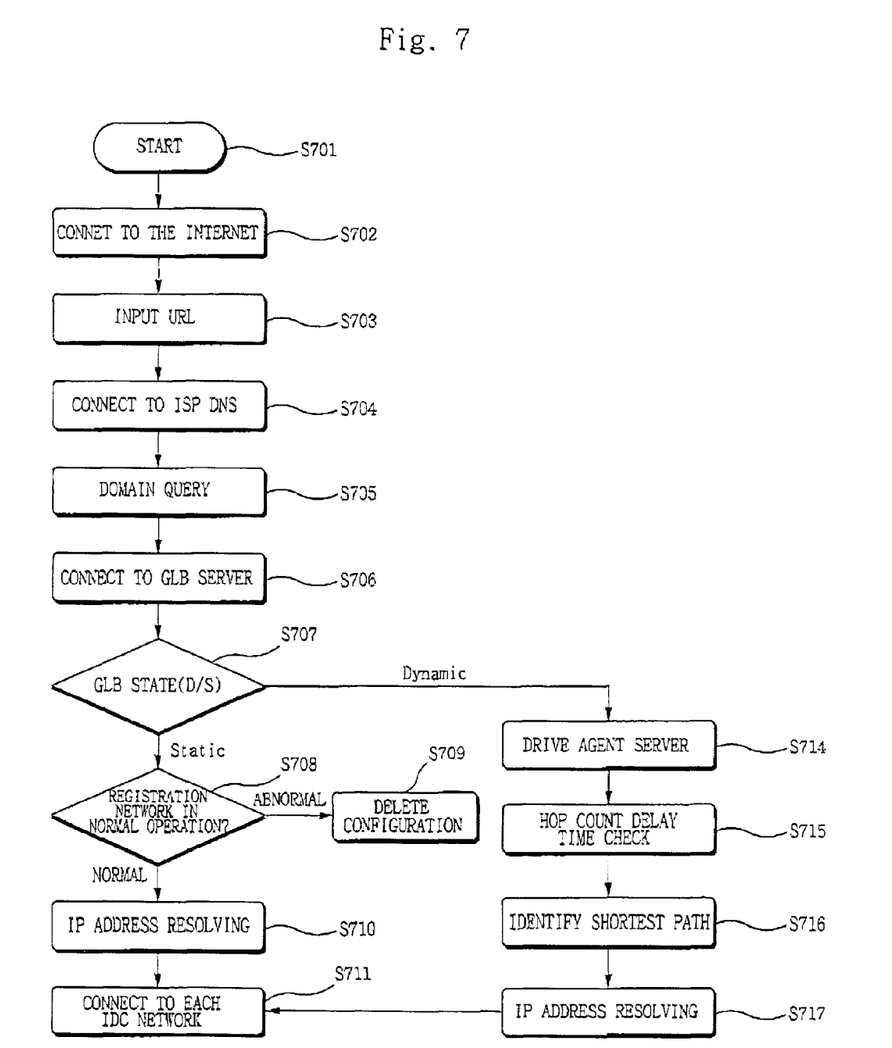
FIG. 7 is a flow chart for a dedicated private network service method equipped with GLB functions according to a further embodiment of the present invention.

FIG. 7 is a flow chart for a dedicated private network service method equipped with GLB functions according to a further embodiment of the present invention.

First, a subscriber tries a connection(S701), connects to the internet(S702), and input an URL(S703).

Thereafter, if connected to the DSN of an ISP(S704), the DNS performs a domain query(S705) and connects to the GLB server(S706). At this time, the GLB server determines an IP forwarding state as static or dynamic(S707), in case of static, checks if a registration network is in normal operations(S708), and performs the IP address resolving as to networks registered in the GLB server(S710), to thereby enable the connection with dispersal to other IDC center networks(S711).

In case of dynamic, an agent server is separately mounted and driven(S714), checks HOP count, delay time, and so on, as to a network to reach(S715), identifies the shortest path(S716), performs the IP address resolving as to a related network(S717), to thereby enable the connection with dispersal to other IDC center networks(S711).

Figure 8:
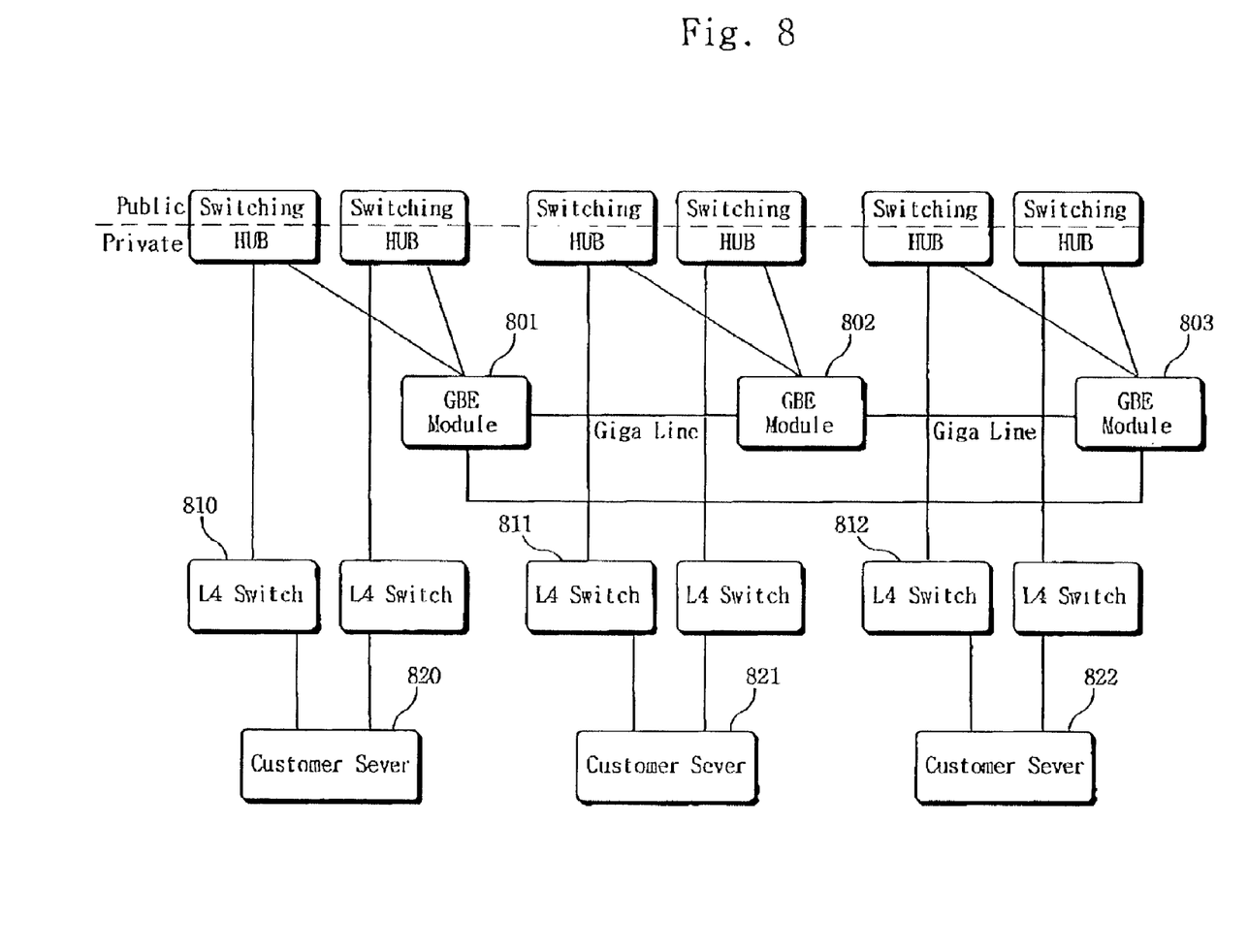
FIG. 8 is a view for showing a structure of a dedicated private network equipped with a GLB function according to a further embodiment of the present invention.

FIG. 8 is a view for showing a structure of a dedicated private network equipped with a GLB function according to a further embodiment of the present invention.

As shown in FIG. 8, identical networks are constructed by connecting giga lines in use of GBE modules 801, 802, and 803 mounted in dedicated private network switching hubs built in respective IDCs, and L4 switches 810, 811, and 812 and customer server 820, 821, and 822 are provided as well, enabling load balance between the respective IDC networks and SLB functions.

Next, a description on the SLB functions according to a further embodiment of the present invention will be made as follows.

In connections to the respective IDC center networks via the international internet and NSP in the TCP/IP network, a network is constructed by using the public IP address commonly used by all the international internet companies and services are provided by connecting to the systems of service companies, but, due to security matters, when changing the public IP address to the private IP address, services can be more safely provided from the viewpoint of security.

Accordingly, as shown in FIG. 6, when a subscriber with a public IP address connects to a service system, the switching hub changes the public IP address into a private IP address in order for companies to safely provide services.

The private IP network, not depending on the routing protocols BGP and OSPF for interconnecting networks of telecommunication companies or the AS Number applied between respective companies by using the router equipment between network companies as in the existing public internet, is constructed by forming the different IDC centers into one identical network in a ring-shaped network with giga lines by means of switching hubs.

The private network, in case that there is no failure in the private network, load-balances subscriber's connections by dispersing traffic by IDC center through the giga lines connected to the switching hubs, and, in case that there is any failure to a specific IDC, connects the subscriber's connections through a normally operating IDC to provide a bypass path by means of Giga lines already constructed, solving a problem due to the failure.

Traffic load-balanced by using a private network interconnected among the IDC centers by the Giga lines is load-dispersed into servers by means of the L4 switches 810, 811, and 812 for performing the server load balance.

That is, the L4 switches 810, 811, and 812 first detect the states of the servers, select equipment normally operating, perform the load-balancing as to the server, disperse traffic in order for subscribers to use services, detect the states of networks connected to the systems by a network check program installed in the respective systems, and, if failure occur, change to a spare network automatically, to thereby continue operations of services.

Figure 9:
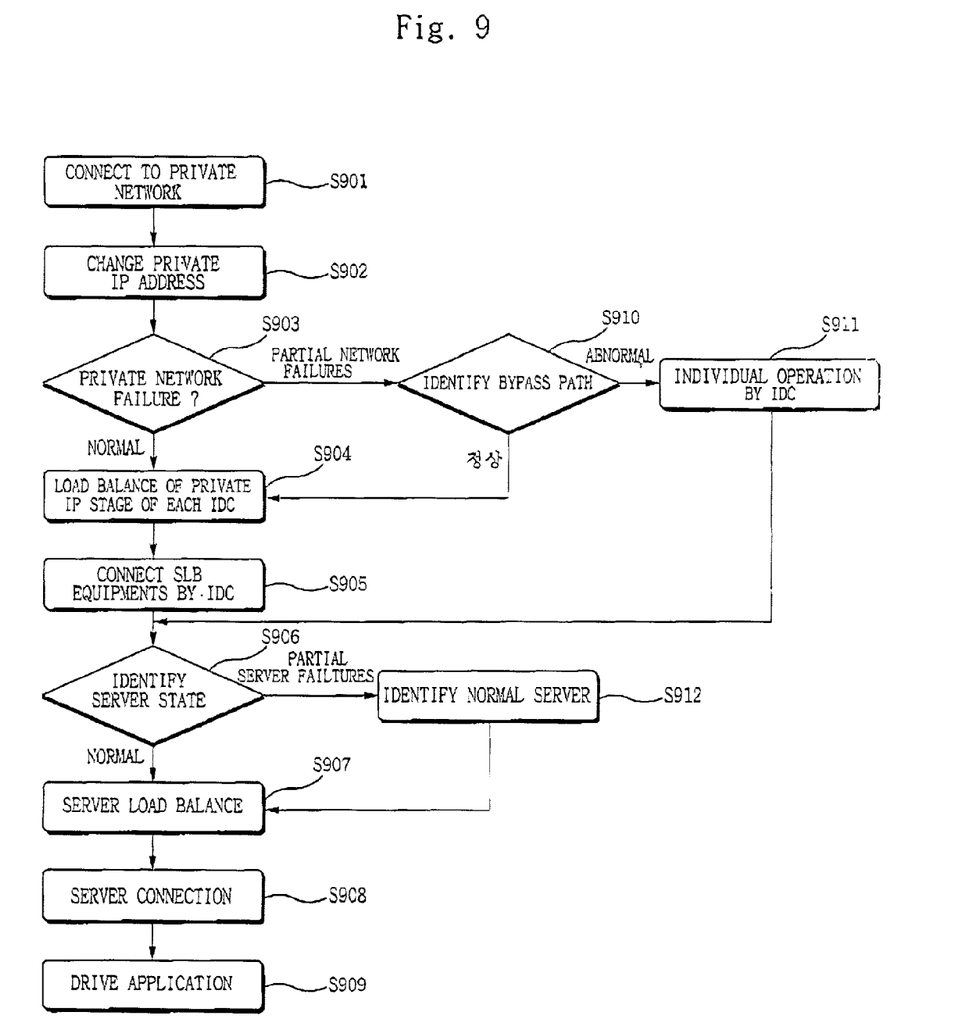
FIG. 9 is a flow chart for a dedicated private network service method having a server load balancing function according to a further embodiment of the present invention.

FIG. 9 is a flow chart for a dedicated private network service method having a server load balancing function according to a further embodiment of the present invention.

As shown in FIG. 9, in order to prevent system invasions by unauthorized subscribers, the subscribers connected through the public network as shown in FIG. 6 are connected to the private IP network provided(S901).

Thereafter, changes are made into private IP addresses (S902), a network is constructed for the subscribers to be operated in the private network, which is a ring-shaped network interconnected by Giga lines among the IDC centers constructed in identical private IP networks, and checks are made on whether failures occur in the interconnected lines with the IDC centers in different places operated in an identical network(S903).

As a result of the checks, when failures occur to part of the networks, a bypass path is automatically identified (S910), and, in case that the bypass path is normal, traffic is load-balanced to plural IDC centers by a GLB server function(S904), or, in case that the bypass is abnormal, operations are individually made by IDC center(S911), and, in case that the private network is normal with no failure, traffic as to the private network is load-balanced through the Giga lines interconnected by IDC center(S904) and connected to the L4 switches in the respective IDC centers(S905).

At this time, the L4 switches in the respective IDC centers check respective server states(S906), and, in case that failures exist to part of the servers, identify a normal server (S912), load-balance to normal servers while preventing connections to abnormal servers(S907), and, in case that all the operating servers are normal, load-balance to all the servers(S907), perform the connections to the servers (S908), and drive a service application(S909).

Figure 10:
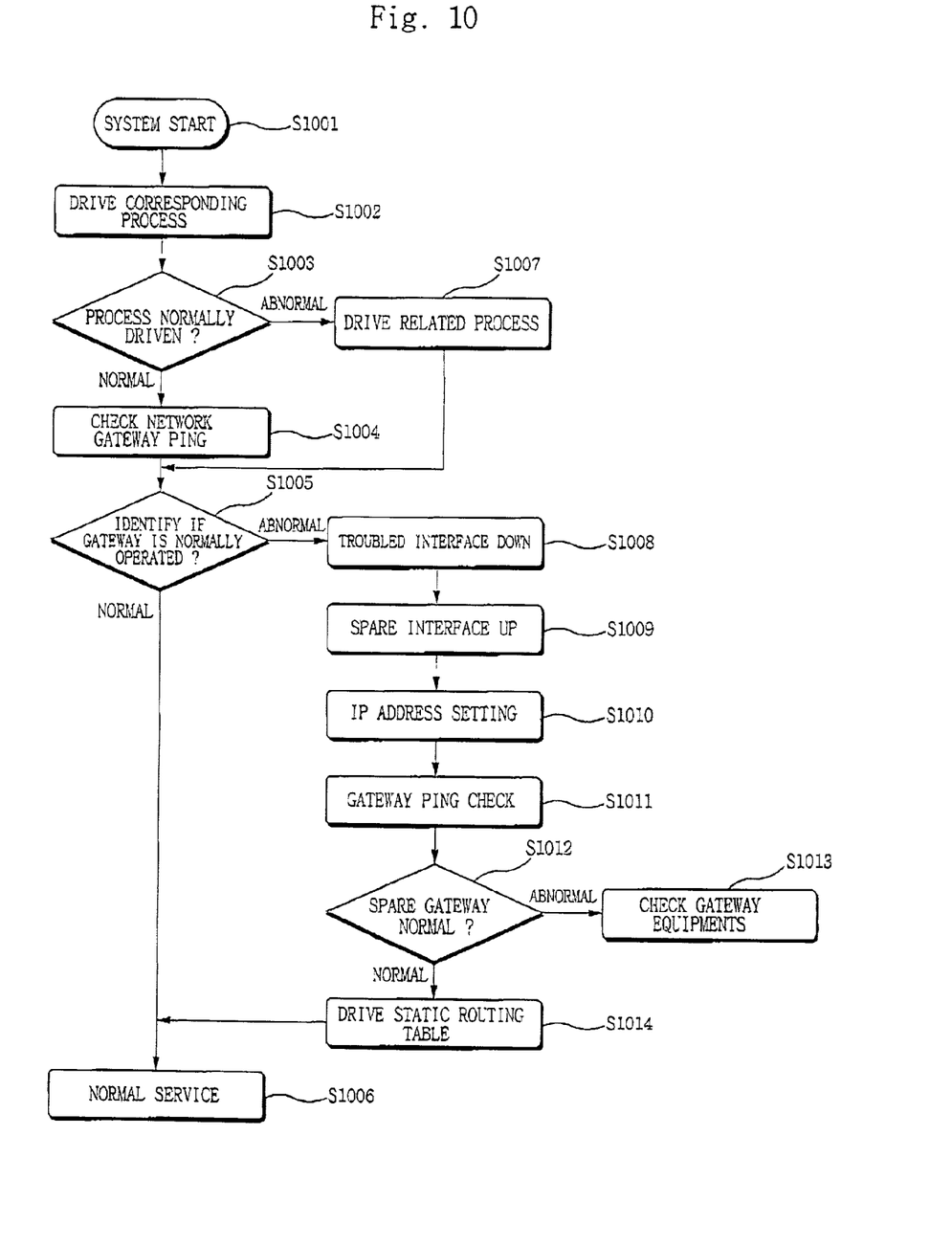
FIG. 10 is a flow chart for a recovery from a network failure in a system.

FIG. 10 is a flow chart for a recovery from a network failure in a system.

As shown in FIG. 10, a system operating services is driven(S1001), a process related to a failure recovery is driven(S1002), and an identification is made on whether the process is normally driven(S1003).

As a result of identification, in case of failing to normally drive, the related process is driven once more(S1007).

If normally driven, the program performs ping checks as to a network gateway operating at present(S1004), checks if the operating gateway normally responses(S1005), and, in case of a normal response, keeps on operating since it can be judged that there is no problem in the network(S1006).

As a result of identification, in case of abnormal, a failure recovery program automatically forces the operational network interface card of a system in failure to break down (S1008), operates a spare network interface card constructed for spare in the system(S1009), sets an IP address related to services(S1010), executes ping checks as to the gateway for the corresponding network with an interface card normally operated(S1011), and identifies if a gateway for a spare network interface card normally operates(S1012).

As a result of identification, if normal, the program executes normal services based on a static routing table driven, and, if abnormal, executes services after checking gateway equipment(S1013).

As described above, the present invention can expand dedicated private network services without any limitation to hardware equipment companies by realizing the dedicated private network services by means of software, construct large-scale private networks by carrying out services without any limitation to the number of connection users and line speeds, and construct a backup system and load-balance to servers through dedicated private networks interconnected with all telecommunication companies by interconnecting the dedicated private networks built in respective internet data centers, to thereby enhance reliability on the dedicated private networks.

Further, the present invention has an advantage in that the private network services can be used at an inexpensive cost without investments to other equipment and building of networks by developed software modules instead of purchasing costly and specific virtual private network(VPN) equipment or structuring a VPN by purchasing a VPN installation program installed in subscriber computers.

Further, the present invention has an effect in that access can be prevented from unauthorized external invaders with GLB technologies realizable in the internet public network and structures enabling an IP address of a subscriber who connects with a public IP address for connections to service servers to change into a private IP address.

Further, in case of connecting to the IDC centers of NSP and ISP companies, the present invention has an effect in that all interconnected IDC centers can perform identical network backups and enables the load balancing by network and server as no failure occurs by constructing network equipment changeable into the private IP network and interconnecting the equipment in Giga lines.

Further, the present invention has an effect in that security problems can be solved by using functions realized in the network equipment.

Further, the present invention has an effect in that non-failure services and operations are available since all are automatically processed from networks to a system with an application of software changeable into a spare interface card upon a failure of a network interface card operating in the system and the preparations against future failures is enabled only with building-up of the system for services without continuing expenses and investments for securing additional backup lines and systems.

Although the preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A system for providing a co-location service equipped with a global load balancing(GLB) function among dispersed IDCs(Internet Data Centers), wherein the co-location service is a network operation service for collectively operating a plurality of private IP networks built in each dispersed IDC as one integrated network by connecting the private IP networks, comprising:

a plurality of switching hubs, connected to each giga port of the IDCs, for changing public IP address into private IP address by constructing a network having public IP address area and private IP address area;

a plurality of giga lines for connecting the plurality of switching hubs using a gigabit Ethernet(GBE) module mounted in each of the plurality of switching hub to thereby integrate the private IP networks into the integrated network;

a layer 4 (L4) switch, connected to the plurality of switching hub, for performing the server load balancing;

a customer server connected to the L4 switch by means of the private IP networks; and a GLB server, connected to a switching hub, for finding a shortest path for a client computer to connect to a server residing in an IDC.

2. A system for providing a co-location service as claimed in claim 1, wherein:

(a) a user authentication server performs a packet filtering if the client computer connect with the private IP networks upon connecting to the internet by using a URL on a web browser;

(b) the client computer connected to the IDC connects with the L4 switch if the client computer is authorized, and GLB server connected to a first switching hub performs the global load balancing, the first switching hub being one of the switching hubs that the client computer first connect with;

(c) the user authentication server performs a user authentication and the L4 switch performs a secondary packet filtering and the server load balancing for service port if the client computer is authorized; and (d) the switching hub assigns private IP addresses, the private IP address being different in accordance with service types, to thereby enable the client computer to use the co-location service.

* * * * *